July 11, 1933. E. P. COOK 1,917,500
RETINOMETER
Filed Feb. 5, 1931 2 Sheets-Sheet 1
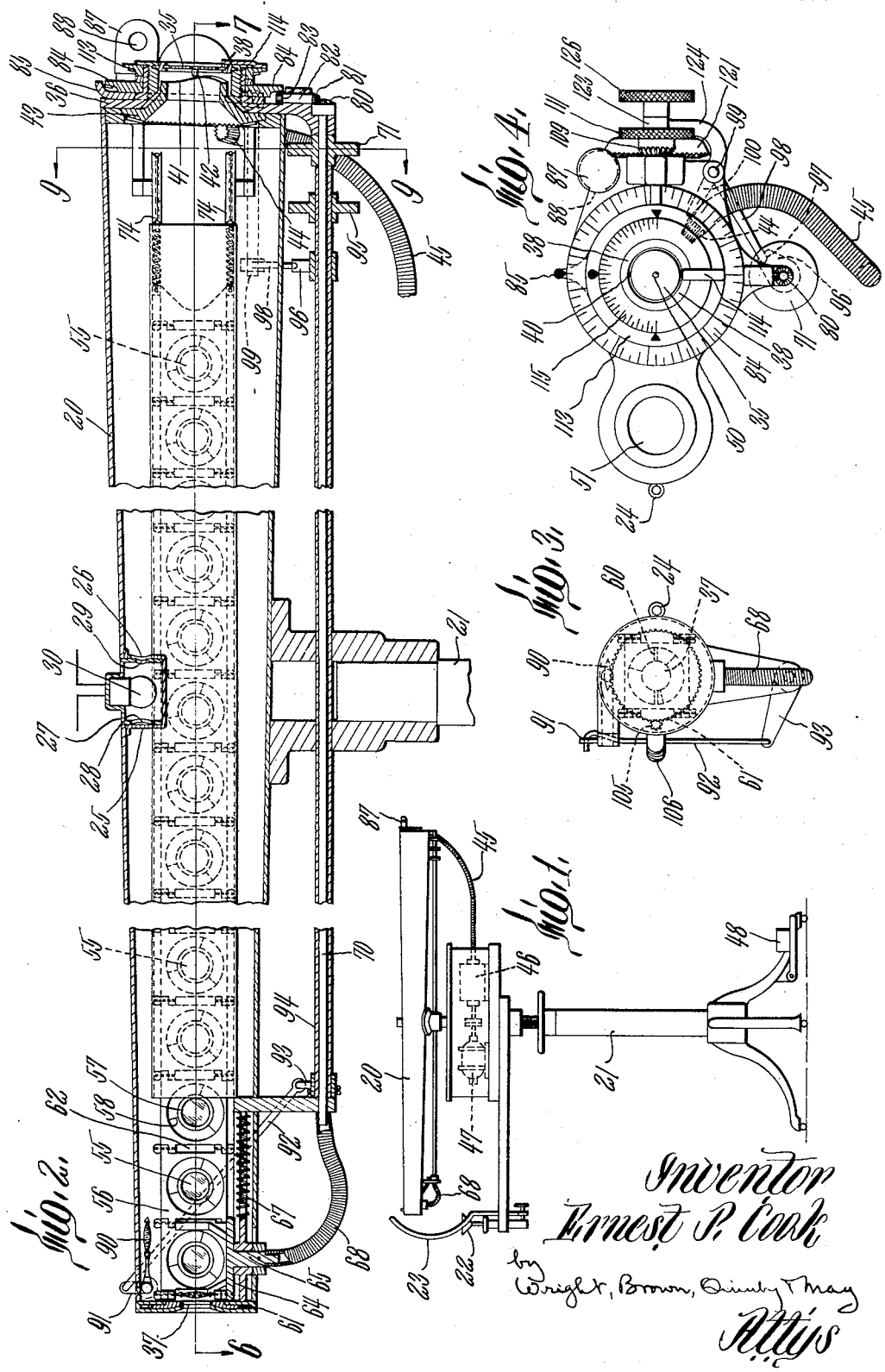
Inventor
Ernest P. Cook
by Wright, Brown, Quinby May
Attys

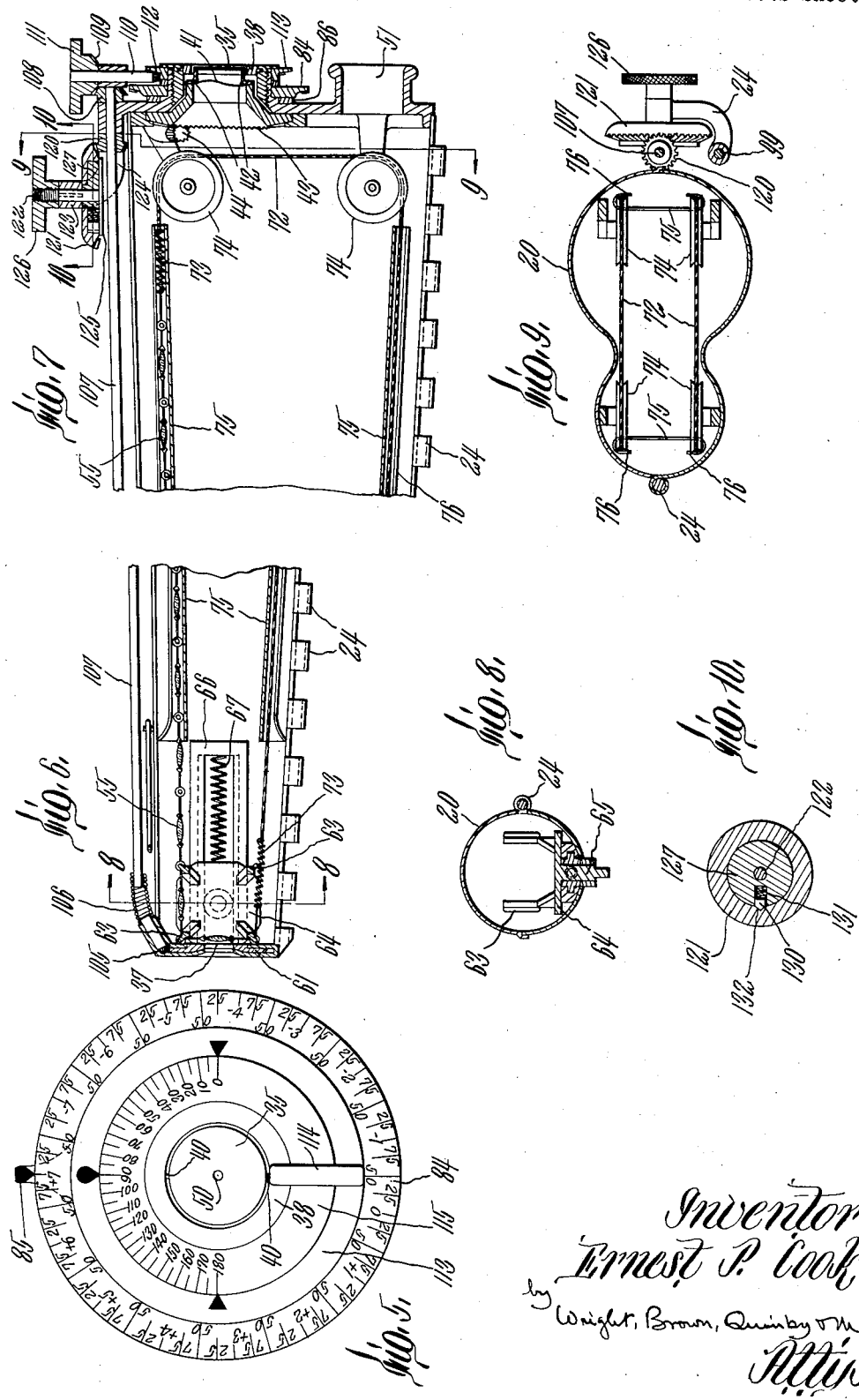

Patented July 11, 1933

1,917,500

UNITED STATES PATENT OFFICE

ERNEST P. COOK, OF BERLIN, NEW HAMPSHIRE

RETINOMETER

Application filed February 5, 1931. Serial No. 513,569.

This invention relates to apparatus for practicing the method of retinoscopy in determining the refraction of the human eye. Retinoscopy is one of the most useful and accurate methods known for measuring the refraction of the eye so as to provide correcting lenses therefor. Briefly, the method consists of reflecting a beam of light from a nearby hooded lamp into the eye of the patient by means of a small mirror in such a way that the light is reflected back to the mirror from the interior of the eye and the emergent rays are observed through a small hole in the center of the mirror, this hole being preferably in the silvering only of the mirror and not extending through the glass. It is an object of this method, as customarily practiced, to place in front of the observed eye a "neutralizing lens" adapted to converge the emergent rays and to bring them to a focus at a finite distance from the eye. In the case of all eyes, except strongly myopic eyes, the neutralizing lens must be convex. It is obvious that the stronger the neutralizing lens, the nearer to the eye will be the focal point of the emerging rays. Instead of moving toward or away from the patient in order to locate by observation the focal point or "point of reversal" of rays emerging from an eye combined with a neutralizing lens, it is convenient to adopt a fixed position of observation and to use in succession neutralizing lenses of different strengths so that a lens can be discovered with which the eye will have a point of reversal at or near the point of observation. For this purpose it is convenient to adopt a distance of one meter from the eye of the patient, since this means an allowance of one diopter in estimating the refraction of the patient's eye from the strength of the neutralizing lens. A smaller distance of observation can be used, but the limits of possible error increase greatly as the distance of observation is diminished. As customarily practiced, this method of retinoscopy involves the use of a trial frame which is worn by the patient, the observer placing in this frame the successive neutralizing lenses. After each lens is placed in the frame, the observer holds his mirror to direct the beam of light toward the pupil of the patient's eye and observes the reflected rays through the peep hole.

In order to determine both the character of the refraction of the observed eye and the approximate location of the point of reversal, the mirror is tilted slightly back and forth on a vertical axis to cause the spot of light on the patient's face to move back and forth horizontaly. If the point of reversal is behind (i. e. beyond) the mirror, the area of light reflected from the pupil of the eye appears to move back and forth laterally with the spot of light on the patient's face surrounding the eye. If the point of reversal is between the observed eye and the mirror, the light from the pupil of the eye appears to move laterally in a direction opposite to the motion of the light on the face. When the neutralizing lens is such that the point of reversal is substantially coincident with the position of the mirror, there is no observable motion of the light in the pupil of the eye when the mirror is tilted. Thus the practice of retinoscopy ordinarily involves the frequent changing of lenses in the trial frame worn by the patient and a tilting back and forth of the observer's mirror after each new lens is inserted. Frequently a considerable number, six or more, lenses is required before the refractive properties of an eye can be determined. In the case of astigmatism, a larger number of neutralizing lenses may have to be employed, as it is necessary to measure the refraction of the eye on both of the principal meridians. If, as is customary, the observer is at a distance of about one meter from the patient, the changing of neutralizing lenses involves leaning forward and reaching out at arm's length to remove a lens from the trial frame and to substitute another. This and the frequent tilting of the mirror involve in the aggregate a great deal of monotonous and fatiguing exertion which tires the observer and in time tends to diminish his powers of accurate perception. The exertion incident to the use of several neutralizing lenses in succession also tempts an observer, particularly toward the end of a day when he is liable to be tired, to curtail the examination by relying on his judgment based on a few observations rather than to check up thoroughly by trying additional neutralizing lenses. This involves danger of incorrect determination of the condition of the eye observed.

It is an object of the present invention to provide mechanism by which practically all of the fatiguing movements now made by the observer are mechanically performed. The various controls for the neutralizing lenses, the tilting of the mirror, and the adjustment of the apparatus made necessary by the presence of astigmatism in the observed eye are all conveniently at hand, as well as a scale for indicating the strength of the neutralizing lens in operating position at any moment. By the use of a mechanism as hereinafter described, not only is the observer saved a great deal of fatiguing exertion, but the distance of observation is accurately maintained and the motions are correctly performed. This aids in the more accurate and careful determination of the refractive properties of the observed eye.

Various other advantageous features will be apparent to one skilled in the art from the disclosure in the following description and in the illustrations of the drawings, of which,—

Figure 1 is an elevation of an apparatus embodying the invention.

Figure 2 is a longitudinal section of the main portion of the apparatus showing most of the working parts.

Figure 3 is an end elevation of the apparatus shown in Figure 2, from the point of view of the patient.

Figure 4 is an end elevation of the apparatus at the observed end.

Figure 5 is an elevation of the dials illustrated in Figure 4, showing the scale markings which may be employed.

Figures 6 and 7 are fragmentary portions of a horizontal section of the apparatus taken on the line 6—7 of Figure 2.

Figure 8 is a section on the line 8—8 of Figure 6.

Figure 9 is a section on the line 9—9 of Figure 7.

Figure 10 is a section on the line 10—10 of Figure 7.

Referring to Figure 1, the retinometer is for the most part included in an elongated housing 20 which is suitably mounted on a tripod standard 21, and, if desired, it is vertically adjustable thereon. This standard may also carry a suitable chin rest 22 and cheek rest 23. The housing 20 is preferably one meter in length and may have any convenient cross sectional shape, such as those shown in Figures 8 and 9. For convenient access to the interior, the housing may be formed in two pieces which may be hinged together as at 24. As far as possible all the surfaces within the casing 20 are finished in dull black to avoid undesirable and confusing reflections. Extending downwardly from the cover portion of the housing is a lamp box 25 having an aperture 26 therein on the side toward the observer's end of the housing. This lamp box is cylindrical and contains an inner box 27 rotatable therein. The inner box may be provided with two or more lateral apertures of varying size. As shown, two apertures 28 and 29 are provided, either of these apertures being brought into registry with the aperture 26 by manual rotation of the inner lamp box 27. Thus the opening for the light beam may be large or small as desired and may be readily changed by rotating the inner lamp box 27. Within the box 27 is mounted a suitable electric light 30. By projecting the lamp box downwardly into the interior of the housing, the lamp is brought as closely as possible into line with the eye of the observer, so that the angle of reflection of the light beam is thus as small as possible. The beam from the lamp is caught by a suitable retinoscopic mirror 35 which is mounted on an end wall 36 of the housing, this wall being slightly tilted so that the mirror which is mounted with its plane parallel to the plane of the end wall 36 will reflect the beam of light directly into a sight hole or aperture 37 in the opposite end wall of the housing. The mirror 35 is mounted within a ring 38 by a pair of pivots 40 which are diametrically opposed. As shown in Figure 4, these pivots may provide a vertical rocking axis for the mirror 35. A rocking motion may be imparted to the mirror as by an edge cam 41 on which ride a pair of ears 42 extending from the rim of the mirror at points preferably ninety degrees from the pivots 40. The edge cam 41 may be on a gear ring 43 which may be rotated by a pinion 44. This pinion may be driven through a flexible shaft 45 and reducing gearing 46 by a suitable electric motor 47. A treadle 48 may be provided for the convenient control of the motor, this treadle operating a suitable rheostat by which the motor may be rotated at any desired speed. Thus by pressing the treadle 48, the mirror 35 may be tilted back and forth through the correct angle for the purpose, on an accurate vertical axis, and with practically no exertion on the part of the operator. The mirror 35 may have a suitable peep hole 50 made by removing a small central portion of the silvering. As most observers naturally use the right eye in sighting through the mirror, the mirror is preferably mounted in a position convenient to the right eye, a simple aperture 51 being left in the end wall of the housing for the left eye.

A set of neutralizing lenses 55 may be mounted in successive frames 56 which may be hinged together as shown, forming a chain. Each lens 55 may be carried in an individual ring 57 suspended by three or more fine wires 58 within a somewhat larger circular opening through a square frame 56. This clearance between the rings 57 and the frames 56 is left so as to permit observation of a diametrical white band 60 on an axometer disk 61. This axometer may have a central perforation registering with the opening 37, and may be rotatable about its center as an axis to move the white band 60 in line with any observed axis of astigmatism in the patient's eye. The frames 56 are hinged together at their upper and lower corners, as shown in Figure 2, leaving an aperture 62 between each pair of successive frames. These apertures are adapted to receive the teeth 63 of a suitable sprocket wheel 64 which is preferably substantially square and which carries four teeth 63. By rotation of the sprocket wheel 64, the neutralizing lenses are moved successively in front of and in line with the aperture 37. In order to insure proper and accurate registry of a lens with this aperture, the sprocket wheel 64 is mounted on a short shaft 65 which is movable in a slotted frame 66 toward or from the aperture 37. A spring 67 is carried by the frame 66 and presses the sprocket wheel toward the end wall of the housing. Since the sprocket wheel itself is of substantially square shape, it has four stable points of rest, in any one of which one of its sides is flat against the end wall of the housing, as shown in Figure 6. The teeth 63 are preferably elongated to hold the lens frames vertical. When the sprocket wheel is turned, its shaft necessarily is moved away from the end wall of the housing against the spring 67 as a corner of the sprocket wheel bears against the end wall of the housing. After the wheel has been turned more than 45°, the action of the spring helps to turn it to bring the next successive side edge of the wall flat against the end wall of the housing, in which position the next neutralizing lens is accurately positioned in line with the aperture 37.

The sprocket wheel 64 may be actuated through a flexible shaft 68 and a shaft 70 extending to the opposite end of the housing. Mounted on the shaft 70 is a finger wheel 71 which may be suitably knurled to facilitate the rotation of the sprocket wheel and the consequent shifting of the lenses. The finger wheel 71, being located at the observer's end of the apparatus, is convenient for manipulation. The ends of the chain of lenses may be connected by a pair of suitable cords or flexible wires 72 through suitable springs 73 adapted to take up any slack in the closed loop thus formed. These cords or wires may extend around suitable idle pulleys 74. A pair of elongated screens 75 may be mounted within the housing, these screens being metal strips with their edges turned over as at 76 to form guiding channels for the lens frames 56. These screens 75 cover the lenses 55 and prevent any objectionable reflections from the surface thereof.

In addition to the finger wheel 71, the shaft 70 also carries a miter gear 80 which meshes with a gear 81 on a short shaft 82. This carries a second gear 83 which meshes with a ring 84 which is mounted on the end wall 36 of the housing to rotate in its plane about its center, and which carries a series of teeth adjacent to its rim. The ring 84 thus rotates when the shaft 70 rotates. This ring may be provided with suitable scale markings, as shown in Figure 5, the scale markings being so spaced as to correspond to the strength of the neutralizing lenses which are successively moved into line with the aperture 37. These lenses may conveniently differ successively in strength by one half diopter, the scale being so arranged that when the shaft 70 is rotated sufficiently to turn the sprocket wheel 64 through an angle of 90°, that is, to replace one neutralizing lens with the next successive neutralizing lens in line with the aperture 37, the scale bearing ring 84 rotates a distance equivalent to one half diopter on the scale. An index 85 may be provided to indicate the strength of the lens in position at any time. This index is carried by a ring 86 which is concentric with the ring 84. As the apparatus is used to best advantage in a dark room, I may mount a small light on the casing to illuminate the scale. The light may be a small electric bulb mounted in a suitable box and covered by a hood 87 which may have a lateral opening 88 and may be manually rotatable to move the opening 88 into or out of registry with a similar opening in the box within the hood. Thus the light may readily be turned on the scale when desired.

As it is usually desirable to use neutralizing lenses differing by one quarter diopter, I have provided an auxiliary lens 90 of one-quarter diopter power which can be swung down in line with the aperture 37 so as to modify the strength of the neutralizing lens in line with the aperture 37. Thus, for example, if the neutralizing lens is plus 2 D., the addition of the lens 90 makes an effective neutralizing lens of plus 2.25 D. The lens 90 may be mounted on a suitable bell crank 91 connected through a rod 92 to a crank arm 93 which is mounted on a sleeve 94 surrounding the shaft 70. Mounted also on the sleeve 94 is a finger wheel 95 by manipulation of which the lens 90 may be moved into or out of line with the aperture 37. The presence or absence of the lens 90 before the aperture 37 may be automatically indicated on the scale of the ring 84 as follows. Mounted on the sleeve 94 is an arm 96 having a recess 97 in the end thereof.

This recess receives the end of an arm 98 of a bell crank which is pivotally mounted as at 99. The shorter arm 100 of the bell crank enters a suitable recess in the periphery of the ring 86 so that when the sleeve 94 is rotated to swing the lens 90 into operative position, the bell crank 98–100 is rocked so as to shift the index 85 one scale division (equivalent to 0.25 D.) toward the right, as in Figure 5. This indicates on the scale an increase of one quarter diopeter in the strength of the neutralizing lens in line with the aperture 37.

In measuring the refraction of an eye on the horizontal meridian, the observer starts with no neutralizing lens before the aperture 37. When the patient is in position with a pupil of his eye alined with the aperture 37, the observer looks through the peep hole 50 in the mirror and observes the nature of the reflection from the eye of the patient. The treadle 48 may then be pressed to rock the mirror back and forth, causing the beam of light to oscillate from side to side. The character of the retinal illumination and its apparent motion give to the observer a preliminary idea of the character of the observed eye. The finger wheel 71 is then turned to bring a neutralizing lens of desired strength into line with the aperture 37, whereupon the mirror is again oscillated and the effect of the oscillation is observed. The neutralizing lens may be readily changed as desired until the lens of correct strength is found to bring the point of reversal substantially in the plane of the point of observation, the auxiliary lens 90 being employed if the desired strength lies between a whole diopter and the adjacent half. Thus the spherical refractive properties of the eye on a horizontal meridian may be determined with great accuracy. In a large percentage of eyes, however, there is present more or less astigmatism. Hence the mechanism is designed to facilitate the examination of eyes on various meridians.

In cases of pronounced astigmatism, the light reflected from the eye is in the form of a band instead of a circle, this band of light indicating clearly one of the principal meridians of the astigmatism. As it is always desirable to measure refraction of the eye on the principal meridians, the ring 38, in which the mirror 35 is mounted, is adapted to rotate about the center of the mirror so as to incline the axis of tilt of the mirror to be in line with any meridian of the eye. To facilitate this alignment, the axometer disk 61 which surrounds the aperture 37 is marked with a diametric white band 60, segments of which extend radially from the central aperture of the disk. When the reflected light from the eye is in the form of a band, the disk 61 is rotated until the segments of the white band 60 are in line with the band of light. The disk 61 is mechanically connected with the ring 38 so that the rotation of the axometer and the rocking axis of the mirror keep in step. To this end the ring 61 may be provided with gear teeth meshing with a pinion 105, the pinion being connected through a flexible shaft 106 to a shaft 107 which extends to the observer's end of the housing. The shaft 107 carries a miter gear 108 which meshes with a gear 109 on a shaft 110. A finger wheel 111 is also on this shaft as well as a miter gear 112 which meshes with teeth on a ring 113. The ring 113, as shown in Figure 4, is connected to the ring 38 as by a rigid link 114 which extends across a fixed ring 115. The ring 115, as shown in Figure 5, may be provided with scale divisions indicating degrees of arc from zero to 180. On the movable ring 113 are suitable index marks to cooperate with the scale on the ring 115, three such marks spaced by ninety degrees being shown in Figure 5. The gearing connecting the axometer 61 with the index ring 113 is so arranged that the number of degrees of rotation of the axometer and of the mirror-supporting ring 38 is accurately indicated on the scale of the ring 115.

As it is usually desirable to measure the refraction of an astigmatic eye on both its principal meridians, and as the principal meridians are nearly always at right angles to each other, mechanism is provided by which the axometer may be conveniently turned through an exact right angle by the sense of touch without having to observe the scale for that purpose. To this end a pinion 120 is mounted on the shaft 107, this pinion meshing with a gear wheel 121 loosely mounted for rotation about the shaft 122. This shaft extends through a supporting collar 123 on the end of a bracket 124, the shaft being splined to the collar 123 to prevent rotation of the shaft. Mounted on one end of shaft is a clamping plate 125, the opposite end of the shaft being threaded for a finger nut 126. Loosely mounted on the shaft 122 is a disk 127 which fits in a circular recess in one face of the gear 121. As shown in Figure 10, a spring pressed detent or click 130 is carried by the disk 127, a spring 131 being employed to press the detent radially outward. The outer end of the detent 130 is provided with a double bevel adapted to fit into a suitable notch 132 in the wall of the recess in which the disk 127 fits. Ordinarily the disk 127 revolves loosely about the shaft 122 when the gear 121 is rotated. When, however, the axometer is in line with a principal meridian of an astigmatic eye, the finger nut 126 may be set tight, clamping the friction plate 125 firmly against the disk 127 so as to prevent rotation thereof. When the finger wheel 111 is then manipulated to turn the axometer, the gear 121 rotates relatively to the disk 127, forcing the detent inwardly as the notch 132 moves out of registry therewith. The gear connections between the gear 121 and the disk 113 are such that a complete revolution of the gear 121 corresponds to a quarter turn of the ring 113 so that when the detent 130 again clicks into the notch 132, the rings 38 and 113 and the axometer 61 have been rotated exactly 90°. Since in nearly all cases, the principal meridians of astigmatism are at right angles to each other, the second principal meridian is thus correctly presented for observation.

The purpose of the three index marks on ring 113 is to enable the observer to read both angles at one time without the necessity of adding or subtracting 90° from one of the angles.

I claim:

1. Apparatus of the class described comprising an elongated housing, an axometer ring having a central aperture and a diametric stripe at one end of said housing, a lamp-box at an intermediate point of said housing, a ring in the opposite end of the housing, a mirror supported in said ring and rockable on a diameter of its ring as an axis, means for adjustably rotating both said rings in their own planes, and means for rocking said mirror when its ring is in any position of adjustment.

2. Apparatus of the class described comprising an axometer disk having a central aperture and a diametrical band, said disk being mounted to rotate in its own plane about its center, a retinoscopic mirror mounted at a fixed distance from said disk, means for rocking said mirror on a substantially vertical axis, means for simultaneously rotating said axometer and the rocking axis of the mirror through equal angles, and means for indicating the angle of rotation of said axometer and axis.

3. Apparatus of the class described comprising an axometer disk having a central aperture and a diametrical band, said disk being mounted to rotate in its own plane about its center, a retinoscopic mirror mounted at a fixed distance from said disk, means for rocking said mirror on a substantially vertical axis, means for simultaneously rotating said axometer and the rocking axis of said mirror through equal angles, and means for facilitating the rotation of said axometer and rocking axis through an exact right angle from any initial position by the sense of touch.

4. Apparatus of the class described comprising an axometer disk having a central aperture and a diametrical band, a neutralizing lens, and means for supporting said lens in operative position in line with said aperture, said means including a plate having a circular aperture larger than the lens, and a plurality of filaments supporting said lens concentrically in said aperture and substantially in the plane of said plate, whereby clearance is maintained around substantially the entire periphery of the lens for observation of the axonometric band when the lens is in operative position.

5. Apparatus of the class described comprising a series of neutralizing lenses successively differing one-half diopter in strength, movable indicating elements remote from said lenses including a scale element and an index element cooperating therewith, means actuable to move said neutralizing lenses successively into operative position and simultaneously to move one of said indicating elements a corresponding amount to indicate the strength of the lens in operative position, a quarter-diopter auxiliary lens separately movable into and out of operative position in line with the operative position for the other said lenses, and means operatively connecting said auxiliary lens with the other said indicating element whereby said other element is shifted when the auxiliary lens is moved into or out of operative position.

6. Apparatus of the class described, comprising a support, a sighting mirror rockably mounted on said support, an axometer disk mounted at a fixed distance from said mirror, said disk having a central aperture and a diametrical band and rotatable about its center, a series of corrective lenses carried by said support and movable selectively into line with said aperture, means including a finger piece actuable to shift said lenses, means including a finger piece actuable to rotate said disk, means in step respectively with said lenses and said disk for indicating the strength of lens in line with said aperture and for indicating the angle of rotation of said disk from normal position, said finger pieces and indicating means all being adjacent to said sighting mirror.

In testimony whereof I have affixed my signature.

ERNEST P. COOK.